May 5, 1925.

F. E. HARTMAN

MEANS FOR GENERATING OZONE

Filed Feb. 3, 1923

1,536,179

Inventor
Frank E. Hartman

Witnesses:—
Chas. L. Griesbauer
C. L. Groff

By D. F. Wolcott
Attorney

Patented May 5, 1925.

1,536,179

UNITED STATES PATENT OFFICE.

FRANK E. HARTMAN, OF SCOTTDALE, PENNSYLVANIA, ASSIGNOR TO ELECTRIC WATER STERILIZER AND OZONE COMPANY, OF SCOTTDALE, PENNSYLVANIA, A CORPORATION OF PENNSYLVANIA.

MEANS FOR GENERATING OZONE.

Application filed February 3, 1923. Serial No. 616,825.

*To all whom it may concern:*

Be it known that I, FRANK E. HARTMAN, a citizen of the United States, residing at Scottdale, in the county of Westmoreland and State of Pennsylvania, have invented certain new and useful Improvements in Means for Generating Ozone, of which the following is a specification.

The present commercial ozonizers develop an efficiency of only 5% in air and 15% in oxygen, while very high concentrations of ozone have never been feasible on a commercial scale. It is the purpose of this invention to increase the efficiency of existing ozone generators, and render feasible the commercial production of high concentration ozone.

By way of illustrating the features sought to be covered by the present case reference may be had to the accompanying drawings in which—

Figure 1:
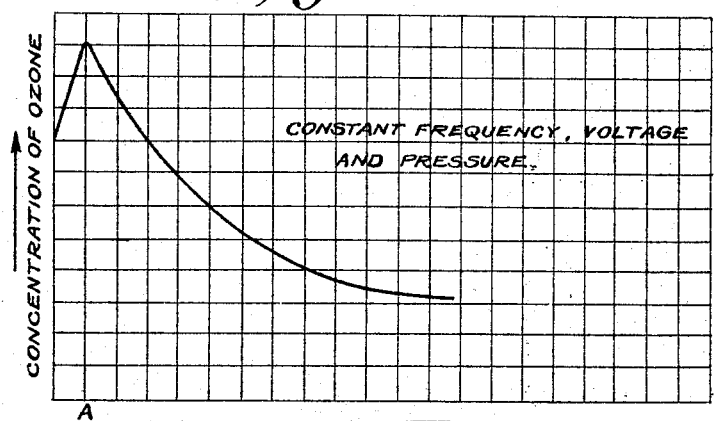
Figure 1 is a graph showing the usual air flow concentration curve.

If we refer to graph shown in Fig. 1, we find the usual air flow-concentration curve, where the ozonizer is operated on a current of constant voltage and frequency, and the gas being ozonized is maintained under constant pressure.

It is seen that a peak is reached in the concentration of the ozone, and this occurs at the point "A" on the ordinate, upon which the air flow is plotted. To the left of the point "A" the air flow is smaller, yet the concentration falls, and this is due to the formation of the oxides of nitrogen at these low air flows. To the right of the point "A" the concentration falls, not due to the formation of oxides of nitrogen, for they are not formed in appreciable quantities at the higher rates of air flow, but the fall is due entirely to the addition of more air to a field of constant energy (a matter of dilution). Graph 1 is familiar to all workers in ozone, and has been published time and time again both in the literature and in the advertising matter of ozone generator manufacturers.

Puschin and Kauchtschen (J. Russ, Phys. Chem. Soc. 46, 576, 1914), in an effort to increase the efficiency of ozone generators, have employed currents of increasing frequency up to 1240 cycles per second, using undamped waves, and they found that for a constant air flow, increase in frequency above 1240 cycles per second caused a decrease in the yield of ozone. While an increasing air flow displaces the maximum toward increasing frequency; but, increasing frequency occasions an increase in temperature, and at atmospheric pressures this cannot be adequately conducted away. Thus, that process is held within narrow limits, as shown in graph of Fig. 2.

Figure 2:
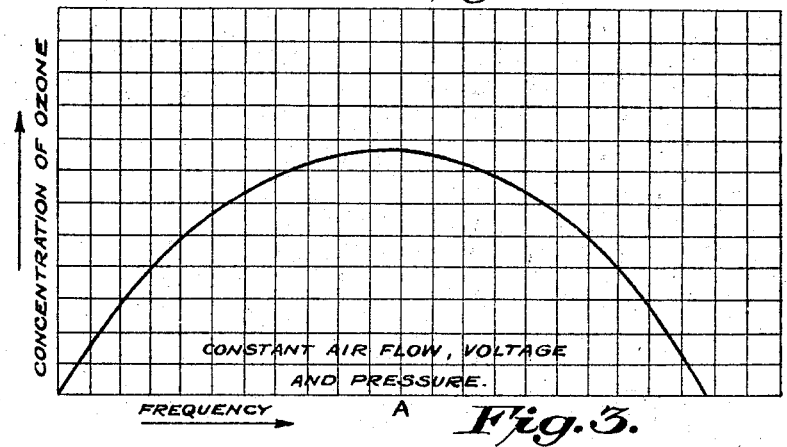
Figure 2 is a graph illustrating the Puschin and Kanshtschen process.

Thus, if the point "A" of graph shown in Fig. 2 is taken at 1240 cycles per second, we will have the characteristic curve of their work. Where the cycles of the current supplying an ozone generator are increased, the energy per unit of electrode surface is increased by a value that is practically a straight line function of the cycles. With this increasing energy, the temperature of the gas is increased.

The thermal conductivity of gases is very poor, it being in a ratio with metals, approximately as 1 is to 100,000. For this reason, it is commercially impractical, if not physically impossible, to increase cooling facilities, at atmospheric pressure of the gas, to such an extent as to maintain the gas that is being ozonized at the temperature that existed before the energy was increased. Therefore, the temperature of the gas rises to such a point that the formation of oxides of nitrogen is again favored, and in addition the thermal decomposition of ozone also takes place.

Figure 3:
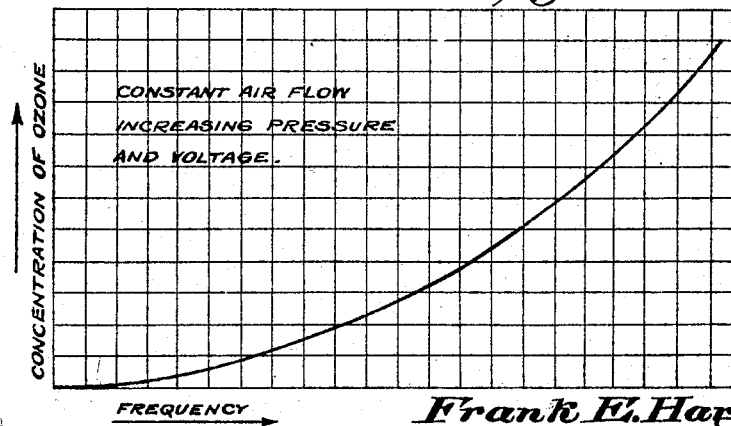
Figure 3 is a graph illustrating the concentration curve obtained by my improved process.

My experiments demonstrated the useful effects of pressure of the gas being ozonized. In my work, the source of high frequency was a high frequency alternator, designed to give varying frequency. Facilities were available for the accurate determinations of the cycles, voltages, energy, pressure and ozone concentrations. Thus, all factors were known and duly considered. A graphical expression of my work is found in graph shown in Fig. 3.

By a careful correlation of all of the various factors bearing upon the results, I found early in my experiments that at elevated pressures the formation of the oxides of nitrogen is inhibited. This prevents a fall in concentrations at low air flows.

Since the dielectric properties of gases increase with the pressure, the voltage must be increased proportionately to the pressure to prevent a fall in energy density. Furthermore, the energy density increases with the cycles, so it became necessary to phase the increases in cycles and voltage in order to obtain any desired results, at any given pressure.

The effect of pressure above atmosphere as revealed by my work is the critical factor of my invention. It renders economically possible the commercial application of high concentration ozone. The oxidation of volatile substances has hitherto been impractical with ozone, due to the lowness of the concentrations available from commercial ozonizers.

I have also found that the effect of elevated pressure, that is, pressures substantially above atmosphere, inhibits the formation of oxides of nitrogen to any appreciable extent, whereas in present methods of producing ozone the oxides of nitrogen readily form, and thereby materially diminish the production of the ozone. Moreover, the effect of elevated pressures has other important bearings upon ozone concentrations. The thermal conductivity of gases is a function of the number of molecules of the gas present in a given volume, or, in other words, to the pressure of the gas. Thermos bottles are made on this principle, a vacuum being a very poor conductor of heat and a compressed gas being a relatively good conductor.

In the previous construction of ozonizers, designed for high energy densities, the air space, or gap between the electrodes, was held very close in order to assist the cooled electrodes in extracting the heat from the gas being ozonized. With increasing gas pressure, however, this gap can be wider, as the compressed gas is a better heat conductor, and passes its heat more readily to the electrode, which in turn gives it up readily to the cooling medium, and thus the heat decomposition of ozone is prevented and this was a limiting feature to the previous ozonizers using atmospheric pressures.

In addition to this, a further advantage of increased pressure is found in the protection it affords the dielectrics against electrical stress. The spacing at and beyond the ends or boundaries of the electrodes must, in generators operating at atmospheric pressure, be relatively large, and this complicates design and increases construction costs. With an increased air pressure, these spaces may be much smaller, and in consequence, cheaper construction cost and better protection against electrical rupture is obtained.

A most important bearing of elevated pressures is found, however, in the fact that the efficiency, expressed in grams of $O_3$ per kilowatt hour, is increased in addition to the increase in the quantity of ozone per tube.

The practical results in the demonstrations referred to herein have been obtained by the use, in the generating unit, of undamped high frequency alternating electrical currents.

I claim:—

1. An improvement in the art of producing gaseous ozone which consists in supplying air under pressure substantially in excess of one atmosphere to the ozone generating unit.

2. An improvement in the art of producing gaseous ozone which consists in supplying to the ozone generating unit a volume of air under pressure substantially in excess of one atmosphere, and subjecting the same to the action of high frequency alternating electrical currents.

3. An improvement in the art of producing gaseous ozone which consists in supplying to the ozone generating unit a volume of air under pressure substantially in excess of one atmosphere, and subjecting the same to the action of undamped high frequency alternating electrical currents.

In testimony whereof I hereunto affix my signature in the presence of two witnesses.

FRANK E. HARTMAN.

Witnesses:
JAMES H. MARR,
EMORY L. GROFF.